United States Patent [19]
Modic et al.

[11] 3,914,369
[45] Oct. 21, 1975

[54] PROCESS FOR PREPARING SILICONE RUBBER MOLDS FROM LEATHER MASTERS

[75] Inventors: Frank J. Modic, Scotia; George M. Dujack, Troy, both of N.J.

[73] Assignee: General Electric Company, Waterford, N.Y.

[22] Filed: June 6, 1974

[21] Appl. No.: 476,940

[52] U.S. Cl. ............................... 264/225; 264/338
[51] Int. Cl.² ........................................... B29C 1/02
[58] Field of Search ............ 264/225, 338; 117/5.1; 106/38.22

[56] References Cited
UNITED STATES PATENTS
2,639,213  5/1953  Barth ................................. 117/5.1

Primary Examiner—Lewis T. Jacobs
Attorney, Agent, or Firm—John L. Young; E. Philip Koltos; Edward A. Hedman

[57]  ABSTRACT

High precision molds are made, without inhibition of the cure rate, by providing a leather master with a barrier coating of a platinum compound prior to casting against the master a curable silicone composition comprising a diorganovinyl-chain stopped diorganopolysiloxane, a silicone resin, a platinum catalyst and a liquid silicone containing silicon-hydrogen bonds.

12 Claims, No Drawings

PROCESS FOR PREPARING SILICONE RUBBER MOLDS FROM LEATHER MASTERS

The present invention relates to an improvement in the manufacture of molds. More particularly, it is connected with a procedure to eliminate inhibition of silicone potting compositions when cast against leather masters in the production of high precision cured silicone molds.

BACKGROUND OF THE INVENTION

One of the applicants herein has been granted U.S. Pat. No. 3,436,366, assigned to the same assignee as this invention, in which there are described silicone potting compositions comprising mixtures of organopolysiloxanes containing vinyl groups. Such compositions are useful in forming high precision molds by being cast against masters, being allowed to cure, and then by stripping the cured composition away from the master.

In Cremer, "Leather and Shoes", July 21, 1973, pages 8–9, there is described a system to prepare vinyl, and similar thermoplastic, shoe uppers by flow molding against a silicone rubber mold which is a replica of a leather master upper. Addition cured silicone compositions, such as those illustrated in the Modic patent, are eminently suitable for producing high precision molds from leather masters except for a tendency to require exceptionally long cure times. The surface of the leather appears to include something which inhibits the curing of such silicone compositions. Aging of the masters for relatively long periods of time appears to minimize the problem, but this is time-consuming and not at all attractive from an economic standpoint.

There has now been discovered a novel improvement for eliminating the inhibition problems associated with leather masters used to make addition cured (platinum catalyzed) silicone molds. To achieve optimum results, it is important to use a composition containing an organohydrogen polysiloxane, rather than a somewhat more conventional hydrolysis product of a dimethyl hydrogen silane-condensed ethyl silicate. In addition, it is a key feature of the present discovery to provide the inhibiting leather substrate with a barrier coat or layer of an active catalytic platinum compound.

Tests have demonstrated that, with many types of leather which badly inhibit the curing of silicone compositions, use of a linear hydride component in combination with a barrier layer of platinum compound completely eliminates the inhibition problem. In addition, only a relatively small amount of platinum is adequate to form a suitable barrier layer and therefore the coat of this precious metal is not a major obstacle to the use of the present invention.

DESCRIPTION OF THE INVENTION

According to the present invention, a process for preparing a mold from a leather master by
i. casting against a leather master a curable silicone composition;
ii. curing the silicone composition to produce a rubber; and
iii. separating the leather master from the rubber to produce a high precision mold is improved by providing the leather master with a barrier coating of a platinum compound before casting step (i).

The silicone composition will generally comprise a diorganovinyl chain-stopped diorganopolysiloxane, an organopolysiloxane copolymer of trimethyl-siloxane units, methylvinylsiloxane units and $SiO_2$ units, a platinum catalyst and a liquid organohydrogenpolysiloxane. Optionally, it can include a conventional filler, e.g., ground quartz, titanium dioxide, calcium silicate, ferric oxide, etc.

Preferably, the silicone potting compositions will be the materials which cure to high tear strength compositions described in the above-mentioned U.S. Pat. NO. 3,436,366, incorporated herein by references. In particular, such preferred compositions comprise, by weight:

1. 100 parts of a liquid vinyl chain-stopped polysiloxane of the formula

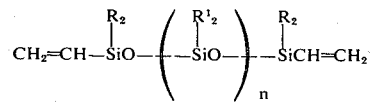

wherein R and $R^1$ are monovalent hydrocarbon radicals free of aliphatic unsaturation with at least 50 mole % of the $R^1$ groups being methyl and n has a value sufficient to provide a fluid material having a viscosity of from about 50,000 to 750,000 centistokes at 25°C.;

2. from 20 to 50 parts of an organopolysiloxane copolymer comprising trimethylsiloxane units, methylvinylsiloxane units and $SiO_2$ units and wherein from about 2.5 to 10 mole % of the silicon atoms contain silicon bonded vinyl groups and the ratio of trimethyl siloxane units to $SiO_2$ units is between 0.5:1 and 1:1;

3. from 0 to 200 parts of a finely divided inorganic filler which is non-reinforcing for silicone elastomers;

4. a platinum catalyst; and 5. an amount of a liquid organohydrogenpolysiloxane having the formula
$(R)_a(H)_bSiO_{(4-a-b)/2}$ sufficient to provide from about 0.5 to 1.0 silicon-bonded hydrogen atoms per silicon-bonded vinyl group in the composition, wherein R is as defined above, a is from 1.000 to 2.10, b is from about 0.1 to 1.0 and the sum of a plus b is from about 2.00 to 2.67, there being at least 2 silicon-bonded hydrogen atoms per molecule.

Such compositions are prepared by mixing in a suitable fashion all of the components, and maintaining the mixture at a low temperature, e.g., 0°C. until curing is desired. The compositions cure at temperatures which vary from room temperature, e.g., 23°C., to temperatures of the order of 100°C. or higher, depending upon the particular amount of platinum catalyst present in the composition and depending upon the time which is allowed for the cure. Curing is accomplished in from 5 minutes to 24 hours. All of the ingredients are well known in the art and reference is made to U.S. Pat. No. 3,436,366 to avoid the need for unnecessarily detailed discussion herein.

The leather master is formed by a conventional procedure, e.g., by producing a model shoe containing all desired design effects and details, such as grains, stitching, perforations, etc. Then the leather master is treated with a platinum compound to produce the barrier layer according to this invention. The platinum compound is applied in any convientent manner, but it is best to use deposition from a liquid medium, e.g., by dipping the master into a solution of the platinum compound in a solvent or emulsion, but preferably by spraying a solution or emulsion onto the surface of the leather master. It is especially economical, convenient and preferred to spray an aerosol of a solution of the platinum compound admixed with an aerosol propellant onto the surface of the leather master.

The type of platinum compound to be used will depend on the means employed to make a barrier layer and, in general, it will be of the same type of compound well known in the art to catalyze the addition of Si—H bonds across double- and triple-bonded carbon to carbon functions. The means employed to make the barrier layer will therefore, generally exclude, finely divided metallic platinum and metallic platinum spread on supports. On the other hand, the chloroplatinic acid compounds of Speier, U.S. Pat. No. 2,823,218, can be used, e.g., as solutions in alcohols, water, glycols, esters, particularly isopropanol and the dimethylether of diethylene glycol. Also suitable are the platinum hydrocarbon complexes of Ashby, U.S. Pat. No. 3,159,601, which are of the general formulae (Pt $Cl_2$.olefin)$_2$ and H (Pt $Cl_3$.olefin) wherein the olefins are alkenes of 2 to 8 carbon atoms, cycloalkenes of 5 to 6 carbon atoms, styrene, and the like. These complexes are formed, e.g., by reacting chloroplatinic acid with the olefin, e.g., ethylene, and they are soluble in hydrocarbon solvents, e.g., benzene, toluene, mineral spirits, or oxygenated solvents, such as dioxane, tetrahydrofuran, and the like. Also suitable as platinum barrier compounds are the platinum cyclopropane complexes of Ashby, U.S. Pat. No. 3,159,662, of the general formula (Pt $Cl_2.C_3H_6$)$_2$. These are made, for example, by treating (Pt $Cl_2.C_2H_4$)$_2$ (described in U.S. Pat. No. 3,159,601) with cyclopropane in chloroform and glacial acetic acid, and they are soluble in hydrocarbon solvents, e.g., benzene, toluene, xylene, mineral spirits, alcohols or ethers, such as octanol or tetrahydrofuran. Further illustrative of suitable platinum compounds are the platinum alcoholate (etherate, carbonyl) complexes of Lamoreaux, U.S. Pat. No. 3,220,972. These are formed by reacting chloroplatinic acid with a higher alcohol, e.g., octanol, or an aldehyde, e.g., octyl aldehyde, or an ether alcohol, e.g., monomethyl ether of diethylene glycol, at 70°–75°C. under a vacuum for about 16 hours. These products also are soluble in alcohols, ethers, benzene, hexane, xylene, toluene, etc., facilitating their application to leather masters.

An especially preferred family of platinum compounds comprises the platinum-vinyl siloxane complexes disclosed in Karstedt, U.S. Pat. Nos. 3,715,334; 3,775,452, both of which are assigned to the assignee of the present invention. These are highly active materials which lend themselves to production of efficient barrier coatings. They are made by effecting a reaction between a platinum halide and an unsaturated siloxane, e.g., 1,3-divinyltetramethyl disiloxane, and removing available inorganic halogen from the resulting reaction product. Especially suitable is a platinum complex of tetramethyldivinyl disiloxane which can be prepared by adding 25 parts of $NaHCO_3$ to a mixture of 25 parts of sodium chloroplatinite, 50 parts of 1,3-divinyltetramethyldisiloxane and 125 parts of ethyl alcohol, heating for 15 minutes at 70°–75°C., then filtering, washing and stripping. The residue is a platinum-divinyltetramethyldisiloxane, substantially free of chemically combined chlorine. It is soluble in many inert organic solvents, e.g., hydrocarbons such as benzene, toluene, xylene, heptane, mineral spirits, alcohols, ethers, and the like, such as ethanol, pentanol, tetrahydrofuran, dioxane, etc.

With respect to all of the platinum compounds, a suitable concentration of the compound in the solvent will provide from 0.1% by weight to 20% or higher by weight assayed as platinum metal. Preferably, however, concentrations assaying as platinum metal in the range of 0.1 to 15% by weight will be used to apply the barrier coating. A solution of the compound in a hydrocarbon solvent, e.g., toluene, assaying for 1% platinum metal, is especially convenient.

In preferred embodiments, the platinum compound is applied as a component in an aerosol spray. Such sprays can be formulated and packaged by means known in the art. Merely by way of illustration, a solution of the platinum compound in an inert organic solvent can be placed in a chamber, then aspirated through a valve, during which it is broken down into a fog or mist of particles. If an appropriate solvent is selected, e.g., butane or propane, this can volatilize and act as a propellant for the aerosol. On the other hand, the solution of platinum compound, e.g., in an inert organic hydrocarbon solvent can be mixed with a conventional aerosol propellant, e.g., a chloro-fluorinated hydrocarbon and packaged. A preferred aerosol spray composition will comprise, by weight, about 10 to 20 parts of a platinum compound solution, e.g., platinum divinyltetramethyldisiloxane, in a solvent, e.g., toluene, (assaying for 1% by weight platinum metal) and about 100 to 150 parts of a commercially available chlorofluorinated hydrocarbon propellant, e.g., a mixture of trichlorofluoromethane and dichlorodifluoromethane.

A light coating or spray of the platinum compound is applied to the leather master and after evaporation of any solvents, the catalyzed silicone compositions is cast against the master and allowed to cure. After cure is complete, the leather master is stripped from the mold. The mold can then be used by taking a vinyl sheet, laying it in the cavity and subjecting the assembly to flow molding, e.g., using microwave generated heat to cause the vinyl to flow into the mold to produce the desired article, as described, for example in the "Leather and Shoes" publication cited above.

DESCRIPTION OF THE PREFERRED EMBODIMENTS

The following examples illustrate the improved process of the present invention. They are intended to provide an understanding of the invention, but the claims are not to be construed as limited to the examples.

EXAMPLE 1

An aerosol spray can is charged with the following composition:

|  | Parts by Weight |
|---|---|
| platinum tetramethyldivinyl disiloxane (1% by weight in toluene)* | 15 |
| trichlorofluoromethane-dichlordifluoromethane propellant** | 135 |

*Karstedt, U.S. 3,715,334, Example 2
**Freon 11/12

The can, which contains about 150 g. of the composition at 1974 prices, contains about $0.60 worth of platinum.

Four samples of leathers of the type known as "buffed crust" are subjected to a spray treatment with the aerosol spray. Control samples are also prepared but are not sprayed.

A silicone potting composition is prepared following the teachings of U.S. Pat. No. 3,436,366. The composition is prepared as follows: To 100 parts of a divinyl-chain stopped dimethyl polysiloxane having a visosity of 80,000 centistokes at 25°C. is added a 50% xylene solution of a copolymer of trimethyl siloxane units, $SiO_2$ units and methylvinylsiloxane units. The various units are present in an amount sufficient to provide 0.8 trimethylsiloxane units per $SiO_2$ unit and with methylvinyl siloxane units being present in an amount such that 7.0 mole percent of the silicon atoms are present as methylvinylsiloxane units and the remaining silicon atoms are present as a portion of a trimethyl siloxane unit or an $SiO_2$ unit. Component (i) and (ii) are premixed to give a solvent-free basis ratio of 100:33, by weight, and the mixture is heated at 110°C. and 25 mm. for 4 hours to remove the xylene and form a solution of component (ii) in (i). 67 parts (per 100 parts of (i)) of finely ground quartz having an average particle size of less than 5 microns is added. Then a platinum catalyst comprising 1 part of chloroplatinic acid in 1 part of n-butyl alcohol is added to provide $10^{-5}$ gram atoms of platinum per mole of silicon-bonded vinyl groups in the composition. Finally, 7 parts (per 100 parts of (i)) of an organohydrogenpolysiloxane component is added to the liquid comprising a 30 centistoke viscosity copolymer of dimethylhydrogensiloxane units, methylhydrogen siloxane units and dimethyl siloxane units containing from 0.7 to 0.9% hydrogen atoms by weight of the copolymer.

Pieces of the leathers are placed in aluminum dishes and covered with about one-fourth inch of the composition above-mentioned. After a 16 hour cure at 23°C. the specimens are examined. Without the pretreatment, the compositions were undercured, sticky and showed evidence of severe inhibition by the leather surface. With the pretreatment, all of the compositions have cured to good, high tear strength rubbers, with no evidence of tack and from which the leather piece can easily be stripped to have a precision mold.

Many other leathers which badly inhibit the silicone composition are found to be completely satisfactory following a light spray of the platinum aerosol composition.

Other leathers, which have been "finished" in a conventional fashion, are tested as masters and found to have slightly tacky molds of the silicone composition are also improved with a light spray application of the platinum composition. After this treatment, molds prepared from these masters are also completely cured in 16 hours at 23°C.

EXAMPLES 2-4

The procedure of Example 1 is repeated substituting as the catalyst silicone composition those of the following components:

| Example | Component (1), parts (vis. cks.) | Component(2), parts | Component(3) parts | Component(5) parts |
| --- | --- | --- | --- | --- |
| 2 | 100(110,000) | 33 | 67 | 7 |
| 3 | 100( 55,000) | 33 | 67 | 7 |
| 4 | 100(110,000) | 20 | 60 | 6 |

(1) vinyl-terminated polydimethyl siloxane
(2) copolymer component
(3) quartz filler
(5) Si-H linear hydride.

These compositions form precision molds when cured against platinum compound treated masters. Their cure is inhibited when the leather master is not pretreated.

Obviously, other variations in the process of this invention will suggest themselves to those skilled in the art in view of the above detailed disclosure. For example, instead of spraying with an aerosol, the barrier coating can be applied by dipping the leather master in a solution of platinum-divinyltetramethyl disiloxane in toluene (assaying for at least 0.1% platinum metal) and evaporating the solvent. Instead of the platinum complex of the example, there can be used chloroplatinic acid hexahydrate; a platinum-ethylene complex prepared as described in U.S. Pat. No. 3,159,601; a platinum-cyclopropane complex prepared as described in U.S. Pat. No. 3,159,662; and a platinum octanol reaction product prepared as described in U.S. Pat. No. 3,220,972.

The invention has been broadly described and variations may be made without departing from the spirit and scope thereof.

We claim:

1. In a process for preparing a mold from a leather master comprising:

i. casting against a leather master a curable silicone potting composition comprising a diorganovinyl chain-stopped diorganopolysiloxane, an organopolysiloxane copolymer of trimethylsiloxane units, methylvinylsiloxane units and $SiO_2$ units, a platinum catalyst and a liquid organohydrogenpolysiloxane;

ii. curing said potting composition to produce a silicone rubber; and iii. separating the leather master from the cured silicone rubber to produce a high precision mold, the improvement which comprises the step of providing the leather master with a barrier coating of a platinum compound capable of catalyzing the addition of Si—H bonds across double and triple-bounded carbon to carbon functions, before casting step (i), in an amount sufficient to prevent inhibition of curing step (ii) by inhibitors normally present in the leather master, said barrier coating being applied to said leather master by treatment with a solution of said platinum compound in an organic solvent.

2. A process as defined in claim 1 wherein said potting composition comprises, by weight, 1. 100 parts of a liquid vinyl chain-stopped polysiloxane of the formula

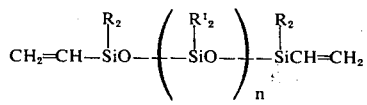

wherein R and $R^1$ are monovalent hydrocarbon radicals free of aliphatic unsaturation with at least 50 mole % of the $R^1$ groups being methyl and n has a value sufficient to provide a fluid material having a viscosity of from about 50,000 to 750,000 centistokes at 25°C.;

2. from 20 to 50 parts of an organopolysiloxane copolymer comprising trimethylsiloxane units, methylvinylsiloxane units and $SiO_2$ units and wherein from about 2.5 to 10 mole % of the silicon atoms contain silicon bonded vinyl groups and the ratio of trimethyl siloxane units to $SiO_2$ units is between 0.5:1 and 1:1;

3. from 0 to 100 parts of a finely divided inorganic filler which is non-reinforcing for silicone elastomers;

4. a platinum catalyst; and 5. an amount of a liquid organohydrogenpolysiloxane having the formula
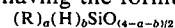
sufficient to provide from about 0.5 to 1.0 silicon-bonded hydrogen atoms per silicon-bonded vinyl group in the composition, wherein R is as defined above, $a$ is from 1.00 to 2.10, $b$ is from about 0.1 to 1.0 and the sum of $a$ plus $b$ is from about 2.00 to 2.67, there being at least 2 silicon-bonded hydrogen atoms per molecule.

3. A process as defined in claim 1 wherein said barrier coating of the platinum compound is applied to the leather master by deposition from solution.

4. A process as defined in claim 3 wherein said barrier coating is applied by spraying a solution of the platinum compound on the surface of the leather master.

5. A process as defined in claim 4 wherein said barrier coating is applied by spraying an aerosol of a solution of said platinum compound in an organic solvent admixed with an aerosol propellant.

6. A process as defined in claim 1 wherein said platinum compound comprises chloroplatinic acid.

7. A process as defined in claim 1 wherein said platinum compound comprises a platinum hydrocarbon complex.

8. A process as defined in claim 1 wherein said platinum compound comprises a platinum alcoholate.

9. A process as defined in claim 1 wherein said platinum compound comprises a platinum-vinylsiloxane complex.

10. In a process for preparing a mold from a leather master comprising:
  i. casting against a leather master a curable silicone potting composition comprising a diorganovinyl chainstopped diorganopolysiloxane, an organopolysiloxane copolymer of trimethylsiloxane units, methylvinylsiloxane units and $SiO_2$ units, a platinum catalyst and a liquid organohydrogenpolysiloxane;
  ii. curing said potting composition to produce a silicone rubber; and
  iii. separating the leather master from the cured silicone rubber to produce a high precision mold, the improvement which comprises the step of providing the leather master with a barrier coating of a platinum compound, by spraying a solution of a platinum complex of tetramethyldivinyldisiloxane dissolved in an inert organic solvent on the surface of the master, before casting step (i), in an amount sufficient to prevent inhibition of curing step (ii) by inhibitors normally present in the leather master.

11. A process as defined in claim 10 wherein said barrier coating is applied by spraying an aerosol of a solution comprising a platinum complex of tetramethyldivinyl disiloxane dissolved in an inert organic hydrocarbon solvent and an aerosol propellant comprising an inert chlorofluorinated hydrocarbon.

12. A process as defined in claim 11 wherein the aerosol spray comprises, by weight, about 10 to 20 parts of a solution of platinum-tetramethyldivinyl disiloxane dissolved in toluene, assaying for 1% platinum metal, and about 100 to 150 parts of a chlorofluorinated hydrocarbon propellant comprising a mixture of trichlorofluoromethane and dichlorodifluoromethane.

* * * * *

UNITED STATES PATENT AND TRADEMARK OFFICE
CERTIFICATE OF CORRECTION

PATENT NO. : 3,914,369
DATED : October 21, 1975
INVENTOR(S) : F.J. Modic and G.M. DuJack It is certified that error appears in the above—identified patent and that said Letters Patent are hereby corrected as shown below:

In Col. 1, lines 4 and 5, "connected" should read -- concerned --;
on line 51, "boat" should read -- cost --.
In Col. 7, line 21, "100" should read -- 200 --.

Signed and Sealed this ninth Day of March 1976

[SEAL]

Attest:

RUTH C. MASON
*Attesting Officer*

C. MARSHALL DANN
*Commissioner of Patents and Trademarks*